Feb. 5, 1963 R. F. HAYS, JR 3,076,921
DAMPED SYNCHRONOUS REPEATER
Filed Jan. 27, 1961
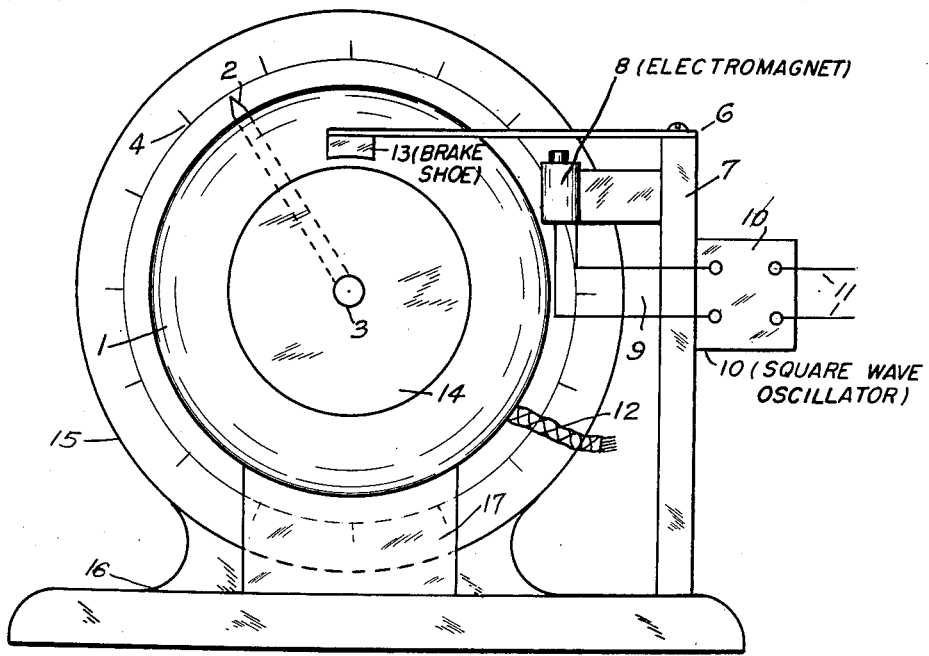
Robert F. Hays, Jr.
INVENTOR.

3,076,921
DAMPED SYNCHRONOUS REPEATER
Robert F. Hays, Jr., Charlottesville, Va., assignor to Specialties Incorporated, Syosset, N.Y., a corporation of New York
Filed Jan. 27, 1961, Ser. No. 85,389
3 Claims. (Cl. 318—24)

This invention relates to means and method for damping synchro repeaters.

Synchro repeaters are commonly used as indicating instruments. The indicator consists of a case containing a dial and a synchro repeater with a pointer attached to the synchro shaft. The synchro repeater is electrically connected to the synchro transmitter which is usually remote from the indicator. The synchro repeater rotates with the synchro transmitter so that the pointer position indicates the angular position of the synchro transmittter. Such indicators are commonly used in aircraft for the indication of flap position, angle of attack, fuel flow, etc.

A serious disadvantage to the use of usual synchro repeaters is due to the fact that prior synchro repeaters have had no damping except that due to the friction of the bearings and the slip rings. This friction must ordinarily be kept as small as possible in order to obtain an accurate static indication. As a result, the pointer moves in a rough, jerky manner and over-shoots and sometimes oscillates about the proper position so that the repeater pointer moves with a rougher motion than the transmitter. It is desirable to have the pointer damped to prevent over-shoot or oscillation and frequently it is desirable to have the pointer damped to the extent that its motion will be smoother than that of the transmitter.

Viscous damping is desirable since with that type damping asymmetrical oscillation of the transmitter does not introduce any error in the average position of the pointer. For some indicator applications, considerable smoothing is imperative and in the past synchronous or synchro type indicators could not be used.

My invention consists of a method of damping a synchro type indicator so that it has the equivalent of viscous damping.

The drawing is a front elevation of my synchro damping device as applied to a conventional synchro repeater.

Repeater 1 may be of conventional type and having pointer 2 attached to shaft 3. The pointer is rotatable with the shaft and its position may be read with respect to scale 4. A resilient spring arm 5 of magnetizable metal is attached at its end 6 to a suitable support 7 which may be a part of the repeater casing or frame, or it may be any suitable support. Electromagnet 8 is supported on member 7 and is connected by conductors 9 to the output of square wave oscillator 10 which may be connected to a source of power by conductors 11. Such oscillators are well known. Electrical current is supplied to the synchro repeater through cable 12 which may have the necessary number of conductors, frequently being five in number. Brake shoe 13 is attached to the operating end of arm 5.

The invention consists, as shown in the drawing, of the cyclical application of the brake shoe 13 which either stops or considerably slows the motion of the pointer at regular intervals. This is done by providing the synchro repeater with a brake disc or drum 14 attached to shaft 3 and with the brake shoe 13 which is applied to the disc 14 at regular intervals. The brake shoe may be oscillated by either electrical or mechanical means.

The torque, T, produced by a synchro repeater is proportional to its displacement relative to the transmitter. The angle, $\Delta\theta$, through which the synchro may rotate from a standing start in a given time interval, $t$, during which the brake is released is $$\Delta\theta = \frac{Tt^2}{2J}$$

where $J$ is the moment of inertia of the rotating parts. The angle $\Delta\theta$ through which the synchro repeater rotates during the time interval during which the brake is released is proportional to torque and therefore to the displacement of the synchro repeater relative to the transmitter. If the brake is applied and released cyclically at a constant frequency, the average speed of pointer movement is $\Delta\theta$ divided by the time for one cycle. If the brake is operated at a sufficient frequency the poiinter moves in small steps, the size of each step is proportional to the displacement of the pointer relative to the transmitter, and the steps are so small and so frequent that the pointer appears to move continuously at a rate proportional to its displacement relative to the transmitter. In this case the pointer has the practical equivalent of viscous damping. The degree of damping can be varied by varying the ratio of the time the brake is applied to the time it is released and by varying the frequency with which the brake is operated, also by varying the degree of braking.

Synchro repeaters equipped with my braking system are steadier and more reliable in operation than prior repeaters, providing more accurate results, and making much easier the task of reading the instrument, particularly when the quantity being indicated is subject to fluctuation. This improved operation is shown by applicant's demonstration apparatus. When used in aircraft my improved repeater provides quicker determinations and increases the safety factor.

Scale 4 is marked on disc 15 which is attached to base 16. The synchronous repeater 1 may be attached to disc 15 by means of brackets extending beyond pointer 2 or it may be fastened to post 17 rising from base 16, as shown.

What I claim is:

1. In a synchro repeater system including a transmitter and a repeater connected therewith, means for braking said repeater to reduce its rate of rotation, and means connected with said braking means for causing said braking means to be alternately effective and ineffective at frequencies corresponding to degrees of damping desired.

2. In a synchro repeater system including a transmitter and a repeater connected therewith, means for braking said repeater to reduce its rate of rotation, and means connected with said braking means for causing said braking means to be alternately effective and ineffective at a rate which produces apparent unidirectional continuous rotation of said repeater while said transmitter is rotating in one direction.

3. The synchro repeater system as described in claim 1, the periods of effective application of said braking means being of predetermined duration with relation to the ineffective periods of said braking means.

References Cited in the file of this patent

UNITED STATES PATENTS

| | | |
|---|---|---|
| 1,684,260 | Brown et al. | Sept. 11, 1928 |
| 2,140,380 | Gawehn | Dec. 13, 1938 |
| 2,393,189 | Richmond | Jan. 15, 1946 |

FOREIGN PATENTS

| | | |
|---|---|---|
| 1,045,516 | Germany | Dec. 4, 1958 |

OTHER REFERENCES

General Electric Bulletin No. GEA-722B, September 1930, page 5.

Lauer, Lesnick, Matson: Servomechanism Fundamentals, pages 63, 64, McGraw-Hill, New York, 1947.

Johnson, T. C.: Selsyn Design and Application, Transactions AIEE, volume 64, October 1945, pages 703–708.